Oct. 20, 1936.  O. KASELITZ  2,057,957
PRODUCTION OF POTASSIUM NITRATE
Filed May 2, 1934
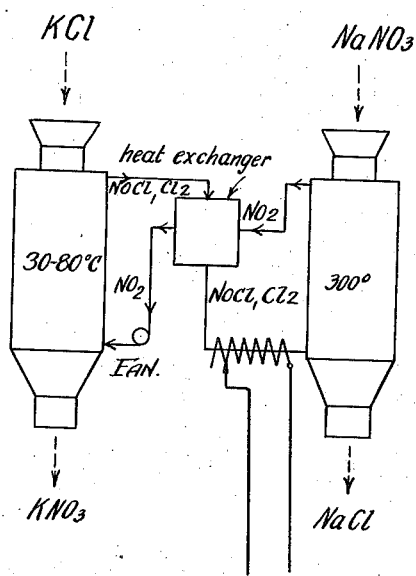
Inventor:
Oskar Kaselitz
by Karl Kirkauer
Atty.

Patented Oct. 20, 1936

2,057,957

UNITED STATES PATENT OFFICE 2,057,957

PRODUCTION OF POTASSIUM NITRATE

Oskar Kaselitz, Berlin, Germany

Application May 2, 1934, Serial No. 723,482
In Germany May 31, 1933

2 Claims. (Cl. 23—102)

My invention relates to the production of potassium nitrate from sodium nitrate. It is an object of my invention to improve the processes hitherto used in carrying through this reaction.

The conversion of sodium nitrate into potassium nitrate as hitherto practiced, was carried through in hot concentrated solutions, from which the sodium chloride formed in the course of the double conversion with potassium chloride is separated, while the solution is still hot. This hot solution must further be cooled, the washing water must be evaporated and the final product dried. As a rule a purified sodium nitrate is used as starting material. The process according to the present invention is also based on the interaction of sodium nitrate and potassium chloride, but the process of conversion, i. e. the exchange of the nitrate and the chlorine radicles, is carried through by way of the gaseous phase, nitrous gases and more especially nitrogen dioxide being used as conversion agent, entering into reaction with the potassium chloride to form potassium nitrate and nitrosyl chloride or chlorine gas according to the equations

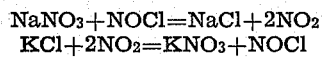

$$NaNO_3 + NOCl = NaCl + 2NO_2$$
$$KCl + 2NO_2 = KNO_3 + NOCl$$

In another reaction chamber solid sodium nitrate is acted upon with the nitrosyl chloride and/or chlorine formed in the first stage of the reaction, whereby the quantity of nitrogen dioxide originally present is regenerated and the chlorine recovered under the form of sodium chloride. This process, which comprises a circulation of the gases in contact with sodium nitrate and thereafter with potassium chloride at the same temperature, the nitrogen dioxide contents being replenished from solid sodium nitrate, is rendered possible by the fact that at the same temperature sodium nitrate decomposes more readily than potassium nitrate.

It is possible to quantitatively react equivalent quantities of sodium nitrate and potassium chloride without any variation of temperature and therefore without any heat losses. In the reaction with sodium nitrate a slightly elevated temperature (up to 300° C.) and in the reaction with potassium chloride the same or a lower temperature, down to room temperature, may be used. External heat is supplied to the system in order to raise and maintain the temperature accordingly.

In carrying through this process, it is not necessary that water be strictly kept out. The percentage of moisture and of nitrogen dioxide may be so chosen that the vapor pressure is lower than the percentage which corresponds to the vapor pressure at the lowest temperature occurring in the process, so that the condensation of water or of nitrogen dioxide from the gas is obviated. A potassium chloride containing 3 to 5% moisture may be applied directly without any condensation arising.

I am aware that it is old to react potassium chloride with nitrogen dioxide to form potassium nitrate. It is however new to replenish the nitrogen dioxide consumed in this reaction by the decomposition of sodium nitrate. In this step, instead of purified sodium nitrate, a less high-grade material including caliche or residual masses may be used, the contents of nitrogen of these materials being thus utilized in a particularly economical manner. The final product is a solid body, which need not be separated from a solution and dried. The chlorine is removed under the form of sodium chloride.

In practicing my invention I may for instance proceed as follows:—

Example 1

One of two reaction vessels, which are insulated against heat losses and provided with means for heating them by electricity to 250° C., is filled with sodium nitrate, the other one with the equivalent quantity of potassium chloride. The two vessels are so arranged that the gases can be sucked or forced by a fan from the sodium nitrate to the potassium chloride and back to the sodium nitrate. On the process being started, the free spaces in the reaction chambers are filled with nitrogen dioxide. By causing circulation of the gases in the direction mentioned above, the reaction proceeds within a few hours to the extent that almost all of the sodium nitrate is converted into sodium chloride, the potassium chloride into potassium nitrate. Apart from the heat lost by radiation and convection no energy is lost in this process.

Example 2

A reaction vessel serving to receive the sodium nitrate under the form of crude saltpeter (caliche containing about 25% NaNO3), which is well insulated against heat losses, is heated by means of electric resistances or by means of heated gases to about 300° C. The other vessel contains the quantity, corresponding to the quantity of nitrate in the first vessel, of potassium chloride containing about 5% water, as obtained in the production of KCl. The temperature in this chamber may vary between 30 and 80° C. The free space in the vessels is filled with nitrogen dioxide. A fan serves for circulating the gases from the crude nitrate to the potassium chloride and for carrying the nitrosyl chloride formed in this latter chamber back to the crude nitrate. A heat exchanger inserted between the vessels serves to cool the hot $NO_2$ formed in the decomposition of the sodium nitrate to the moderate temperature at which potassium nitrate is formed, the cold reaction gases being at the same time preheated to the temperature of the sodium nitrate decomposition. The conversion of the potassium chloride into potassium nitrate is ended after a few hours and the starting material spent almost completely.

Apart from the heat lost by radiation from the heated vessel and the heat lost in the heat exchanger during heating of the circulating gases to the decomposition temperature, no external energy is required in this process.

The drawing is a flow sheet illustrating the process as described with reference to Example 2.

Various changes may be made in the details disclosed in the foregoing specification without departing from the invention or sacrificing the advantages thereof.

I claim:—

1. The method of producing potassium nitrate which comprises acting on potassium chloride with nitrogen dioxide at a temperature between room temperature and about 300° C., supplying heat to the mixture of nitrosyl chloride and chlorine leaving the KCl, conducting it at about 200–300 C. in contact with sodium nitrate, passing the hot $NO_2$ in heat exchange relation with fresh NOCl and $Cl_2$ formed in the reaction and causing the nitrogen dioxide formed in the reaction to act on a fresh portion of solid potassium chloride.

2. The process which comprises reacting potassium chloride with gaseous nitrogen dioxide at a temperature ranging from about 30° to 80° C. to produce potassium nitrate and a mixture of gaseous nitrosyl chloride and chlorine, heating said gaseous mixture and passing it in contact with crude sodium nitrate at a relatively higher temperature ranging from about 200° to 300° C. to form sodium chloride and nitrogen dioxide, and recycling said nitrogen dioxide back to the first step of the process.

OSKAR KASELITZ.